US011568267B2

(12) United States Patent
Das et al.

(10) Patent No.: US 11,568,267 B2
(45) Date of Patent: Jan. 31, 2023

(54) INDUCING CREATIVITY IN AN ARTIFICIAL NEURAL NETWORK

(71) Applicant: International Business Machines Corporation, Armonk, NY (US)

(72) Inventors: Payel Das, Yorktown Heights, NY (US); Brian Leo Quanz, Yorktown Heights, NY (US); Pin-Yu Chen, White Plains, NY (US); Jae-Wook Ahn, Nanuet, NY (US)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 16/816,331

(22) Filed: Mar. 12, 2020

(65) Prior Publication Data

US 2021/0287101 A1    Sep. 16, 2021

(51) Int. Cl.
  *G06N 3/08*    (2006.01)
  *G06N 20/10*   (2019.01)
  *G06K 9/62*    (2022.01)
  *G06N 3/063*   (2006.01)

(52) U.S. Cl.
  CPC ........... *G06N 3/088* (2013.01); *G06K 9/6218* (2013.01); *G06K 9/6262* (2013.01); *G06N 3/063* (2013.01); *G06N 20/10* (2019.01)

(58) Field of Classification Search
  CPC ...... G06N 3/088; G06N 3/063; G06N 3/0472; G06N 3/0454; G06N 20/10; G06K 9/6218; G06K 9/6262
  See application file for complete search history.

(56) References Cited

U.S. PATENT DOCUMENTS 5,659,666 A * 8/1997 Thaler .................. G06N 3/04
                                                   706/30
7,454,388 B2   11/2008 Thaler
7,778,946 B2    8/2010 Hercus
(Continued)

FOREIGN PATENT DOCUMENTS

CN    108596337    9/2018
DE   102005045120  3/2007
(Continued)

OTHER PUBLICATIONS

Varshney et al., A Big Data Approach to Computational Creativity, Nov. 2013.*
(Continued)

*Primary Examiner* — John B Strege
(74) *Attorney, Agent, or Firm* — Lieberman & Brandsdorfer, LLC

(57) ABSTRACT

Embodiments relate to a system, program product, and method for inducing creativity in an artificial neural network (ANN) having an encoder and decoder. Neurons are automatically selected and manipulated from one or more layers of the encoder. An encoded vector is sampled for an encoded image. Decoder neurons and a corresponding activation pattern are evaluated with respect to the encoded image. The decoder neurons that correspond to the activation pattern are selected, and an activation setting of the selected decoder neurons is changed. One or more novel data instances are automatically generated from an original latent space of the selectively changed decoder neurons.

20 Claims, 7 Drawing Sheets

(56) References Cited

U.S. PATENT DOCUMENTS

| | | |
|---|---|---|
| 9,015,093 B1 | 4/2015 | Commons |
| 9,875,440 B1 | 1/2018 | Commons |
| 9,892,364 B2 | 2/2018 | Tang et al. |
| 2007/0011119 A1 | 1/2007 | Thaler |
| 2020/0320402 A1* | 10/2020 | Yoon ...................... G06N 3/088 |

FOREIGN PATENT DOCUMENTS

| | | |
|---|---|---|
| GB | 2336227 | 10/1999 |
| WO | 2006122030 | 11/2006 |

OTHER PUBLICATIONS

Colombo, F., et al., "Deep artificial composer: A creative neural network model for automated melody generation." In International Conference on Evolutionary and Biologically Inspired Music and Art (pp. 81-96). Mar. 2017.

Hassan, A., et al. "Evaluation of tactical training in team handball by means of artificial neural networks", Journal of sports sciences, 35(7), 642-647, May 2016.

Das, Payel, et al., "Toward A Neuro-Inspired Creative Decoder", arXiv: 1902.02399v4, Apr. 23, 2020.

International Search Report (dated Jun. 18, 2021).

McFowland, Edward, III., "Fast Generalized Subset Scan for Anomalous Pattern Detection", Journal of Machine Learning Research 14 (2013), pp. 1533-1561.

Quanz, Brian, et al., "Machine Learning Based Co-Creative Design Framework", 33rd Conference on Neural Information Processing Systems (NeurIPS 2019), arXiv: 2001.08791. Jan. 23, 2020.

Thaler, Stephen L., "Cycles of Insanity and Creativity Within Contemplative Neural Systems", Medical Hypotheses 94, pp. 138-147 (2016).

* cited by examiner

INDUCING CREATIVITY IN AN ARTIFICIAL NEURAL NETWORK

BACKGROUND

The present embodiments relate to inducing creativity in an artificial neural network generative model. More specifically, the embodiments relate to unsupervised learning to generate novel creative data instances via modification to neuron activation patterns of the neural network.

SUMMARY

The embodiments include a system, computer program product, and method for inducing creativity in an artificial neural network.

In one aspect, a system is provided for use with an artificial intelligence (AI) platform to induce creativity in an artificial neural network (ANN), with an encoder and decoder, through automatic selection and manipulation of neurons from one or more layers of the encoder. The system includes a server with a processing unit is operatively coupled to memory and in communication with the AI platform, which is embedded with tools in the form of an encoding manager, an evaluation manager, and an activation manager. The encoding manager functions to sample an encoded vector for an encoded image. The evaluation manager functions to evaluate decoder neurons and a corresponding activation pattern for the encoded image. The evaluation manager further functions to select decoder neurons based on the evaluated activation pattern. The activation manager functions to selectively change the activation setting of the selected decoder neurons. The processor automatically generates one or more novel data instances from an original latent space of the selectively changed decoder neurons.

In another aspect, a computer program product is provided to induce creativity in an artificial neural network (ANN), with an encoder and decoder, by automatically selecting and manipulating neurons from one or more layers of the encoder. The computer program product includes a computer readable storage medium with embodied program code that is executable by a processing unit. Program code is provided to sample an encoded vector for an encoded image. Program code evaluates decoder neurons and a corresponding activation pattern for the encoded image, and further selects decoder neurons based on the evaluated activation pattern. Program code selectively changes the activation setting of the selected decoder neurons. One or more novel data instances are automatically generated from an original latent space of the selectively changed decoder neurons.

In yet another aspect, a method is provided for inducing creativity in an artificial neural network (ANN), having an encoder and decoder, by automatically selecting and manipulating neurons from one or more layers of the encoder. An encoded vector is sampled for an encoded image. Decoder neurons and a corresponding activation pattern are evaluated with respect to the encoded image, and decoder neurons that correspond to the activation pattern are selected. An activation setting of the selected decoder neurons is changed and one or more novel data instances are automatically generated from an original latent space of the selectively changed decoder neurons.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification and are incorporated herein by reference. Features shown in the drawings are meant as illustrative of only some embodiments, and not of all embodiments, unless otherwise explicitly indicated.

DETAILED DESCRIPTION

Figure 1:
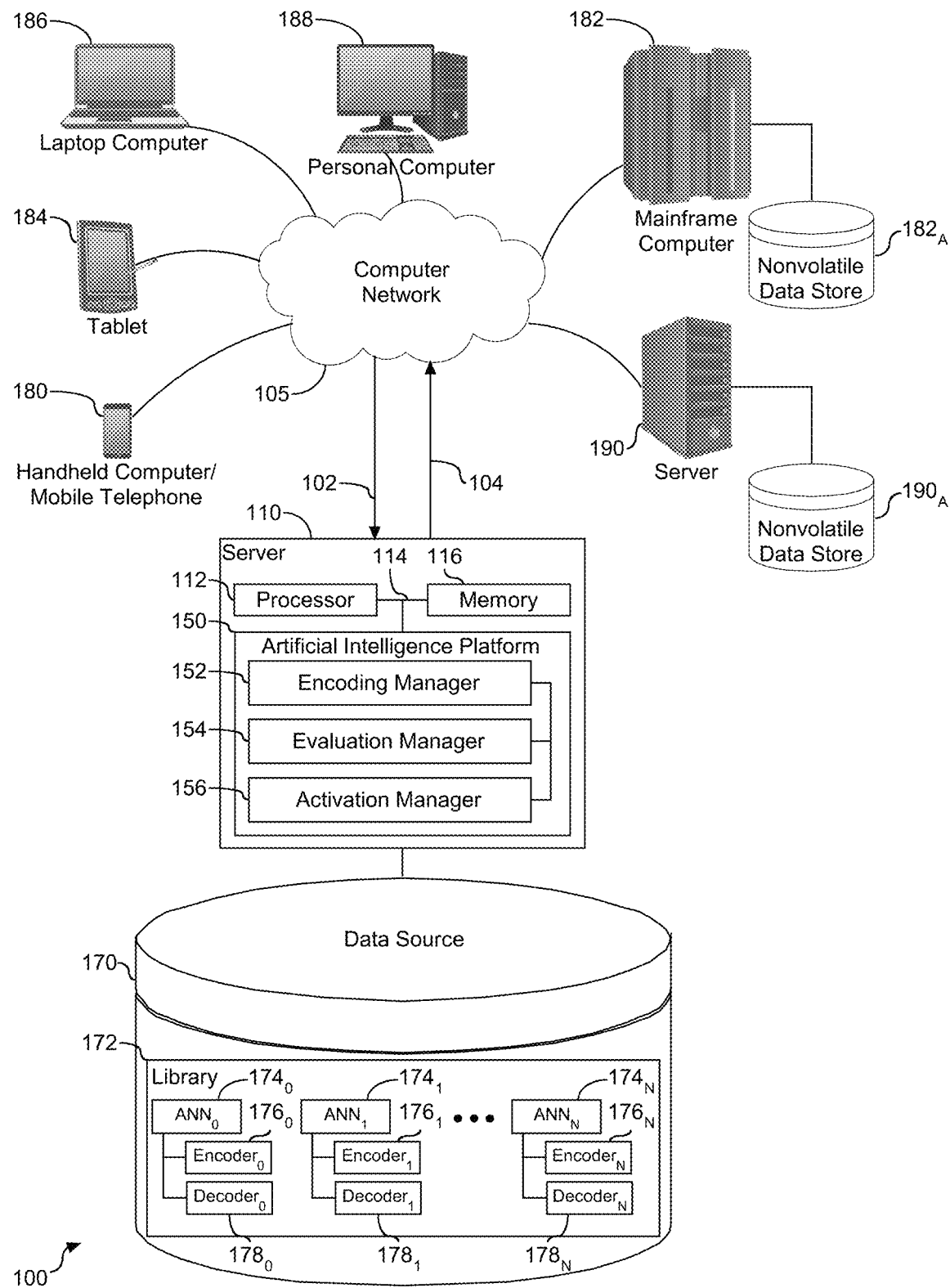
FIG. 1 depicts a system diagram illustrating a computer system with an artificial intelligence platform.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificial intelligent computer systems, natural language systems (such as the IBM Watson® artificially intelligent computer system or other natural language interrogatory answering systems) process natural language based on system acquired knowledge. To process natural language, the system may be trained with data derived from a database or corpus of knowledge.

Machine learning (ML), which is a subset of AI, utilizes algorithms to learn from data and create foresights based on this data. More specifically, ML is the application of AI through creation of models, for example, neural networks that can demonstrate learning behavior by performing tasks that are not explicitly programmed. Deep learning is a type of ML in which systems can accomplish complex tasks by using multiple layers of neurons that activate based on an output or outputs of a previous layer of neurons, creating increasingly smarter and more abstract activations.

At the core of AI and associated reasoning lies the concept of similarity. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult at a practical level.

Deep learning is a method of machine learning that incorporates neural networks in successive layers to learn from data in an iterative manner. Neural networks are models of the way the nervous system operates. Basic units are referred to as neurons, which are typically organized into layers. The neural network works by simulating a large number of interconnected processing units that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to every neuron in the next layer. Eventually, a result is delivered from the output layers. Deep learning complex neural networks are designed to emulate how the human brain works, so computers can be trained to support poorly defined abstractions and problems. Neural networks and deep learning are often used in image recognition, speech, and computer vision applications.

Generative models define procedures that produce samples of data. They can be used to learn representations, to handle exploration, exploitation tradeoffs, and to make use of large amounts of unlabeled data. Deep generative models use ideas from deep learning to build generative models and algorithms for learning them. One form of the deep generative model is referred to as a variational autoencoder (VAE), which is an encoder employed to train a generative mode p(x,z) to maximize a marginal likelihood log p(x) on samples x from a dataset. An autoencoder is a pair of two connected networks, referred to as an encoder and a decoder. The encoder network takes in an input and coverts it into an encoding, which is the output of a hidden layer having a smaller and dense representation of the input. The encoder learns to preserve as much of the relevant information as possible in the limited encoding, and intelligently discard irrelevant parts. The decoder learns to take the encoding and properly reconstruct the original input. For example, in the case of image data, the decoder learns to reconstruct the image input.

A convolutional neural network (CNN) is a type of artificial neural network used in the field of image recognition and processing, and in an embodiment is designed to process pixel data. CNN are provided with hidden layers operatively coupled to input and output. The input is a multi-channeled image. The hidden layers consist of convolutional layers and pooling layers. Each convolution layer comprises a set of independent filters. The filters function to convolve the image received in the input. The output received on convolving the image, e.g. input, with a particular filter is called a feature map. Each neuron is connected only to a small chunk of the input image. Each pooling layer functions to progressively reduce spatial size of the input representation to reduce the amount of parameters and computation in the network.

Once a CNN is built, it can be used to classify content of different images. CNNs classify images by detecting features to identify objects. Correctness of the CNN output is coupled to the strength of the map.

Referring to FIG. 1, a schematic diagram of a computer system (100) to induce creativity in an artificial neural network is depicted. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with an artificial intelligence (AI) platform (150) to induce creativity within object data communicated over the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The AI platform (150) is shown herein configured with tools to induce creativity in an artificial neural network (ANN) generative model, and in an embodiment to evaluate the induce creativity. The tools function to generate novel creative data instances via automatic selection and manipulation of neurons from one or more layers of an operatively coupled decoder. The tools include, but are not limited to, an encoding manager (152), an evaluation manager (154), and an activation manager (156). The AI platform (150) may receive input from the network (105) and leverage a data source (170), also referred to herein as a corpus or knowledge base, to selectively access the artificial neural networks (ANNs). As shown the data source (170) is configured with a library (172) with one or more ANNs that are subject to support and management by the tools (152)-(156). Although only one library is shown, in an embodiment, the data source (170) may be configured with multiple libraries. The library (172) is shown with a plurality of ANNs, including $ANN_0$ ($174_0$), $ANN_1$ ($174_1$), ..., $ANN_N$ ($174_N$). The quantity of ANNs shown is for illustrative purposes and should not be considered limiting. Each ANN has an encoder and an operatively coupled decoder. As shown, $ANN_0$ ($174_0$) is operatively coupled to $encoder_0$ ($176_0$) and $decoder_0$ ($178_0$), $ANN_1$ ($174_1$) is operatively coupled to $encoder_1$ ($176_1$) and $decoder_1$ ($178_1$), and . . . , $CNN_N$ ($174_N$) is operatively coupled to $encoder_N$ ($176_N$) and $decoder_N$ ($178_N$).

The AI platform (150) is shown herein with several tools to support inducing creativity in an ANN generative model. The encoding manager (152) samples an encoded vector for an encoded object. The encoded vector corresponds to the encoded object represented in latent space, e.g. vector space within which the vectors represent features that make up the image are found. In an embodiment, the encoding manager (152) samples from the latent space at random to generate a new object, or the encoding manager (152) can sample a specific object in the latent space that can then be creatively decoded. Accordingly, the sampling conducted by the encoding manager (152) does not need to correspond to a specific object.

The encoding manager (152) identifies the decoder neurons associated with a specific ANN. The decoder neurons are the interconnected basic processing units that function to take the encoding and properly reconstruct the original input. The sampling of the encoded vector activates decoder neurons within the ANN. The evaluation manager (154), shown herein operatively coupled to the encoding manager (152), functions to evaluate neurons and corresponding activation patterns for the encoded object. The activation pattern is an arrangement of activate and non-active neurons. Neuron flipping refers to changing an "active" neuron to "inactive" and from changing an "inactive neuron to "active". The activation pattern functions as a venue or mapping to indicate the activation status of the neurons, and to further indicate which neurons have switched between "active" and "inactive".

The evaluation manager (154) functions to evaluate decoder neurons and a corresponding activation pattern for the encoded object sampled by the encoding manager (152). The evaluation manager (154) selects one or more decoder neurons for status flipping, e.g. status changing, based on the evaluated activation pattern. The evaluation manager (154) selectively identifies "inactive" neurons within the ANN for switching to an "active" activation status, and in an embodiment, selectively identifies "active" neurons within the ANN for switching to an "inactive" activation status. As shown and described herein, there are different algorithms created and utilized by the evaluation manager (154) for neuron flipping. Using these algorithms, the evaluation manager (154) identifies a group, or a cluster, of inactive neurons that are least correlated with an activated group of neurons. The evaluation manager (154) can further randomly select an inactive neuron from the identified cluster, or can identify the cluster as a whole for activation by the activation manager (156). Details of the algorithms and their corresponding protocols are shown and described in FIG. 3-6. Accordingly, the evaluation manager (154) functions to evaluate the activation patterns within the ANN and identify individual neurons or clusters of neurons based on the evaluated activation patterns.

The activation manager (156) is shown herein operatively coupled to the evaluation manager (154), and functions to selectively change, also referred to herein as selectively flip, an activation setting of identified neurons, e.g. one or more selected or identified decoder neurons. As shown and described in FIGS. 3-6, neurons can be selectively activated during a specific decoding task. The activation manager (156) can selectively change a state of an activated or de-activated a neuron, which includes changing a low-active or de-activated decoder neuron into an active state or active neuron, and changing an activated neuron to a low-active or de-activated state. The activation manager (156) can change decoder neurons on an individual level or can individually change a cluster of neurons, e.g. change neuron activation status on a cluster basis at one time. Two criteria are used for selecting neurons, including that the maximum percent activation across all training data in any given class is below a threshold, as in a low-active method but for each class, and that the entropy of percent neuron activation across classes is below a threshold. The activation of low-active neurons creates increasingly smarter and more abstract activations. Accordingly, the activation manager (156) changes the activation setting of selected neurons during a specific decoding task.

There are various embodiments supported with respect to neuron selection and activation modification in association with the evaluation manager (154) capturing concepts encoded in multiple decoder neurons or encoded in clusters of decoder neurons. For example, with respect to capturing multiple decoder neurons, the evaluation manager (154) may randomly select an inactive neuron from a group of inactive neurons that is least correlated with an activated or active group of neurons, and select one or more additional neurons that are correlated with the randomly selected inactive neuron. The activation manager (156) functions to selectively change an activation setting of the selected decoder neurons, which includes activating all of the selected additional neurons. For example, with respect to capturing concepts encoded in clusters of neurons, the evaluation manager (154) identifies cluster membership and randomly selects one or more cluster that have a lowest percent activation for a given instance and decoder layer. The activation manager (156) functions to randomly activate one or more neurons in the randomly selected cluster(s).

A generative model is understood in the art as a class of models that process training data to produce a representation of typical objects of a given type. Activation patterns of the neurons of the generative model can be ascertained during typical object generation or production. From these activation patterns, low active neurons and neuron clusters can be identified. In an embodiment directed at capturing concepts encoded in clusters of neurons, the evaluation manager (154) selects one or more neurons from de-activated neurons that have a low percent activation across generated objects of an object type, and the activation manager (156) activates the selected neurons.

In addition to selection of neurons for status flipping, e.g. status changing, the evaluation manager (154) assesses, e.g. evaluates, creativity reflected from the neuron flipping. The creativity assessment includes characterization of distances between a first encoded object representation and a second modified objection representation that was induced by the ANN. In an embodiment, distances may include different distance and novelty metrics used to evaluate generated values propagated through the layers, e.g. from each neuron to every neuron in the next layer. For example, one metric is the reconstruction distance in which given an original encoded object representation, e.g. latent representation, that is subject to modification by the ANN, the evaluation manager (154) identifies the distance between a modified version of the object and the original object. It is understood in the art that the evaluation manager (154) may employ other metric for assessing creativity induced by the ANN neuron flipping and reflected in the modified object(s). It is further understood that different metric may have different thresholds of characteristics of novelty and creativity. For example, something that is typically novel according to some set of metrics may not be considered according to some other set of metrics. To address metric discrepancy, in an embodiment, two or more metric may be combined, and through this combination the evaluation manager (154) can estimate whether something generated is likely to be more creative or not. Accordingly, these metrics considered individual or in combination represent characterization of creativity and novelty of the ANN associated with the neuron flipping, The network (105) may include local network connections and remote connections in various embodiments, such that the AI platform (150) may operate in environments of any size, including local and global, e.g. the Internet. The AI platform (150) serves as a front-end system that can make available a variety of knowledge extracted from or represented in documents, network accessible sources and/or structured data sources. In this manner, some processes populate the AI platform (150), with the AI platform (150) also including input interfaces to receive requests and respond accordingly.

In some illustrative embodiments, server (110) may be the IBM Watson® system available from International Business Machines Corporation of Armonk, N.Y., which is augmented with the mechanisms of the illustrative embodiments described hereafter. The IBM Watson® system may receive the detected electronic communication as input content (102) which it then subject to processing through a model. Based on application of the content (102) to the model, creativity is induced in the ANN.

The encoding manager (152), evaluation manager (154), and the activation manager (156), hereinafter referred to collectively as AI tools or AI platform tools, are shown as being embodied in or integrated within the AI platform (150) of the server (110). The AI tools may be implemented in a separate computing system (e.g., 190) that is connected across network (105) to the server (110). Wherever embodied, the AI tools function to induce creativity in an ANN and to generate novel creative data instances via modification to neuron activation patterns of the neural network.

Types of information handling systems that can utilize the AI platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store ($190_A$), and mainframe computer (182) utilizes nonvolatile data store ($182_A$). The nonvolatile data store ($182_A$) can be a component that is external to the various information handling systems or can be internal to one of the information handling systems.

The information handling system employed to support the AI platform (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 2:
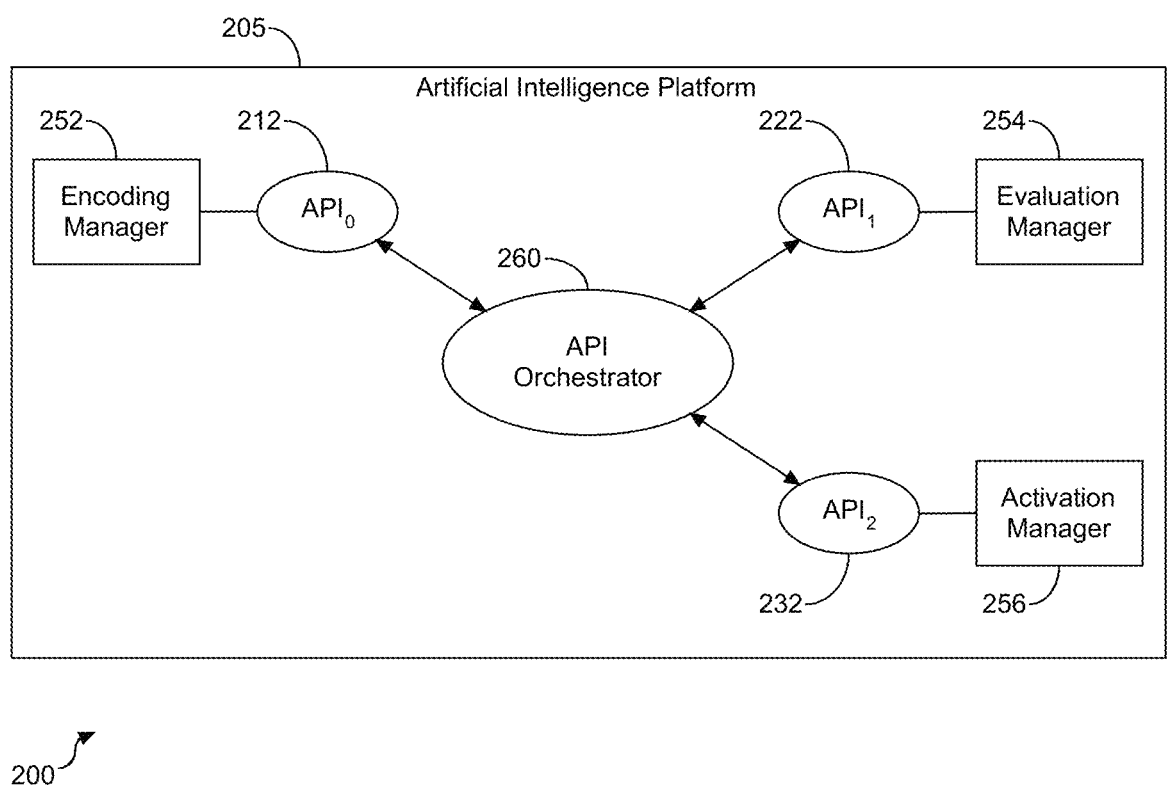
FIG. 2 depicts a block diagram illustrating artificial intelligence platform tools, as shown and described in FIG. 1, and their associated application program interfaces.

An Application Program Interface (API) is understood in the art as a software intermediary between two or more applications. With respect to the AI platform (150) shown and described in FIG. 1, one or more APIs may be utilized to support one or more of the tools (152)-(156) and their associated functionality. Referring to FIG. 2, a block diagram (200) is provided illustrating the tools (152)-(156) and their associated APIs. As shown, a plurality of tools are embedded within the AI platform (205), with the tools including the encoding manager (252) associated with $API_0$ (212), the evaluation manager (254) associated with $API_1$ (222), and the activation manager (256) associated with $API_2$ (232). Each of the APIs may be implemented in one or more languages and interface specifications. $API_0$ (212) provides functional support to sample an encoded vector for a corresponding image, also referred to as an encoded image; $API_1$ (222) provides functional support to evaluate an activation pattern of an encoded image and select neurons for decoding, with the neuron selection corresponding to the evaluated activation pattern; and $API_2$ (232) provides functional support to selectively change an activation setting of the neurons selected for decoding. As shown, each of the APIs (212), (222), and (232) are operatively coupled to an API orchestrator (260), otherwise known as an orchestration layer, which is understood in the art to function as an abstraction layer to transparently thread together the separate APIs. In an embodiment, the functionality of the separate APIs may be joined or combined. As such, the configuration of the APIs shown herein should not be considered limiting. Accordingly, as shown herein, the functionality of the tools may be embodied or supported by their respective APIs.

A neural activation pattern for a selective layer is represented as $d_j^k(z)$, where z represents the sample, k is the layer, $p_\theta$ represents the decoder, and $d_{ji}^k = d_j^k(z_i)$ where $z_i$ is the encoding of the ith training data point. The percentage activation of neuron j in layer k is $a_j^k = (1/n) \Sigma_{i=1}^n \mathbb{1}_{d_{ji}^k > \tau}$, for a given activation threshold r. Neurons with $a_j^k \approx 0$ are classified as inactive or 'off' neurons and are excluded from any further neuronal manipulation mechanism. For the ith input, neuron j of layer k is defined as "active" or "on" if $d_{ji}^k > \tau$, and is otherwise defined as "inactive" or "off". The vector $\vec{d}_j^k$ with the ith entry is represented as $d_{ji}^k$. Given neuron j and neuron h in layer k, $C^{kjh}$ represents covariance matrix Cov [$\vec{d}_j^k, \vec{d}_h^k$]. The correlation between j and neuron h in layer k, $R_{jh}^k$, is defined as $C_{01}^{kjh}/\sqrt{C_{00}^{kjh} C_{11}^{kjh}}$, which are the entries of the layer correlation matrix $R^k$.

Neuron flipping refers to changing an "active" neuron to "inactive" and from changing an "inactive neuron to "active". Relu (rectified linear unit) is an activation function utilized in neural networks. In the context of flipping neurons to inactive for Relu activation, the neuron is set to a minimum activation value, i.e. 0. Conversely, an active or "on" value of a neuron j in layer k, $0_j^k$ is represented as $\lambda \cdot s(\{d_{ji}^k | i=1 \ldots n\})$, where $\lambda$ denotes a scaling factor for the statistic of training activation values, e.g. where s is equal to mean, max, median $x^{th}$ percentile, etc.

Neuronal activations are obtained for sample z for a selected layer k of the decoder, with A representing a corresponding set of active or "on" neurons and D representing a corresponding set of inactive or "off" neurons. During creative decoding, a number or percentage, $\rho$, of a group of "on" and/or "off" neurons in layer k, are changed, e.g. flipped, either randomly or selectively. As shown and described herein, a probabilistic decoding scheme is employed for generative artificial neural networks (ANNs) to capture the spirit of the atypical neuronal activation pattern observed in a creative human brain, i.e. dynamic interaction between a task-positive (control) and a task-negative (default) brain network. After sampling in latent space, decoder neurons are selected based on their activation correlation patterns, and a selection, e.g. subset, of the selected neurons are activated. Different activation schemes are shown and described herein, each scheme selecting a set of inactive neurons to activate, also referred to herein as neuron flipping, using different grouping criteria. In an embodiment, inactive or 'off' neurons. e.g. neurons that are never active across training data, are excluded from consideration and manipulation. The activation schemes shown and described herein include a correlation method, as shown and described in FIG. 3, a clustering method, as shown and described in FIG. 4, a low-active method, as shown and described in FIG. 5, and a non-specific low-active method, as shown and described in FIG. 6. Each of these activation schemes modifies $d_j^k(z)$, and this modified layer output is passed through the remainder of the decoder to obtain final generated values.

Figure 3:
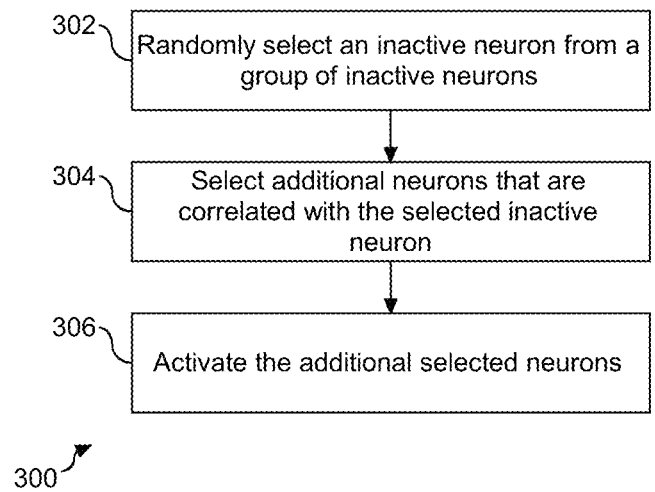
FIG. 3 depicts a flow chart illustrating a correlation co-activated method during a specific decoding task.

Referring to FIG. 3, a flow chart (300) is provided to illustrate a correlation co-activated method during a specific decoding task. As shown and described herein, a fraction of neurons that were originally anti-correlated with active neurons are subject to activation. A de-activated or inactive neuron, from a group D of inactive neurons, that is least-correlated with an activated group of neurons is randomly selected (302). Additional neurons that are correlated with the selected de-activated or inactive neuron are selected (304) and activated (306). These de-activated or inactive neurons are not correlated with the most active neurons, and are viewed or considered as instance-specific task-negative neurons. By using correlation, concepts encoded in multiple neurons can possibly be better captured than pure random selection. Optionally, and in an embodiment, the same quantity of active neurons can be set to inactive, e.g. flipped, from those most correlated with the selected high-active neurons. The following pseudo-code demonstrates the correlation co-active method:

Input: Layer output $d_{jz}^k$; selection fraction K; fraction of neurons to flip on $\rho$.

Figure 4:
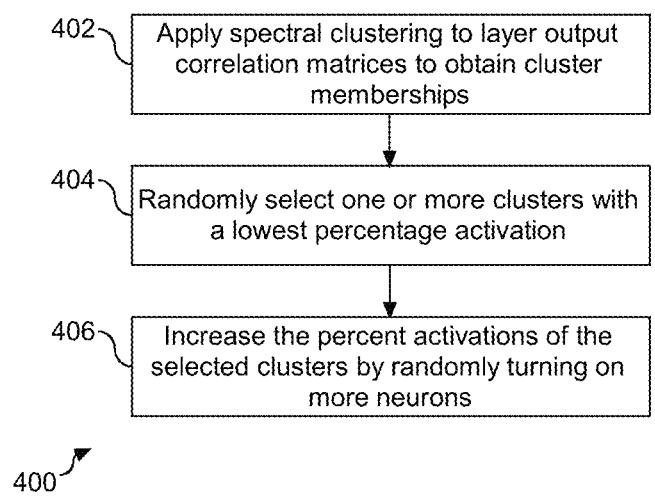
FIG. 4 depicts a flow chart illustrating a clustering method during a specific decoding task.

$\gamma_j \leftarrow (1/|A|)\Sigma_{h \in A} R_{jh}^k d_{hz}^k, j \in D$ $s \leftarrow$ random select from smallest $K|D|$ neurons of $\{\gamma_j\}$ $D_s \leftarrow \text{argmax}_{D' \subset D, |D'|=\lfloor \rho|A|\rfloor} \Sigma_{h \in D'} R_{sh}^k$ $d_{jz}^k \leftarrow o_j^k \forall j \in D_s$ Referring to FIG. 4, a flow chart (400) is provided to illustrate a clustering method during a specific decoding task. The clustering method follows a similar approach to the correlation method shown and described in FIG. 3, except instead of considering individual neurons, clusters of neurons are considered. The clusters of neurons represent instance-specific task-negative sub-networks. Spectral clustering is applied to layer output correlation matrices from the training data, $R^k$, to obtain cluster memberships (402). For a given instance and decoder layer, one or more clusters with a lowest percentage activation are randomly selected, where $\mathbb{1}$ percent activation for cluster $C^k$ is $(1/|C^k|)\Sigma_{j \in C^k} \mathbb{1}_{d_{ji}^k > r}$, (404). The percent activations of the selected clusters are then increased by randomly turning on more neurons in those clusters until the specified number of neurons to turn "on", or alternatively percent increase, is reached (406).

Figure 5:
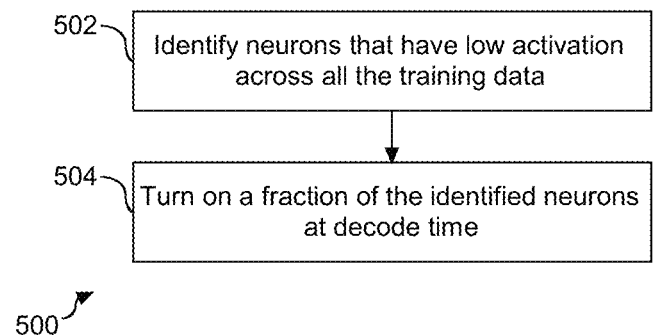
FIG. 5 depicts a flow chart illustrating a low-active method to capture a task-negative concept.

Referring to FIG. 5, a flow chart (500) is provided to illustrate a low-active method to capture a task-negative concept. Those neurons that typically have low activation across all the training data are identified (502), and a fraction of the neurons identified at step (502) are turned "on" at decode time (504). More specifically, at step (502) a neuron is selected from a pool of "off" or inactive neurons that have the lowest percent activations, $a_j^k$. At step (504), "low-active" neurons that are most correlated with the selected neuron are also turned on. The following pseudo-code demonstrates the low-active method:

Input: Layer output $d_{jz}^k$; percent activation percentile K; fraction of neurons to flip on $\rho$.

Figure 6:
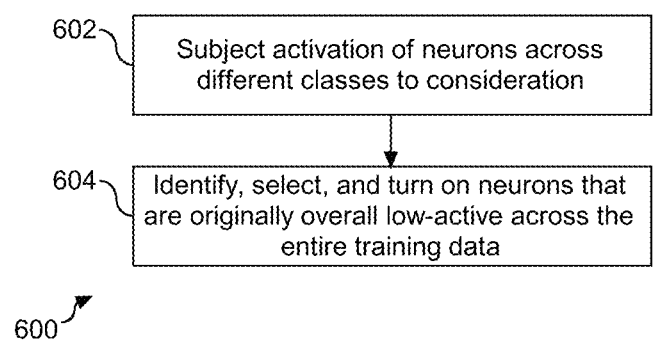
FIG. 6 depicts a flow chart illustrating a non-specific low-active method to capture a task-negative concept.

$t \leftarrow K$-percentile $(\{a_j^k\})$ $S \leftarrow \{j | j \in D \wedge a_j^k \leq t\}$ $s \leftarrow$ random select from $S$ $S_s \leftarrow \text{argmax}_{S' \subset S, |S'|=\lfloor \rho|S|\rfloor} \Sigma_{h \in S'} R_{sh}^k$ $d_{jz}^k \leftarrow 0_j^k \forall j \in S_s$ Referring to FIG. 6, a flow chart (600) is provided to illustrate a non-specific low-active method to capture a task-negative concept. The steps shown herein extend the low-active method shown and described in FIG. 5. As shown, activation of neurons across different classes is subject to consideration (602). Neurons that are or were originally overall low-active across the entire training data and do not show activation beyond a threshold for any specific class, i.e. non-specific, are identified and selected and turned on (604). Two criteria are used for selecting neurons, including that the maximum percent activation across all training data in any given class is below a threshold, as in the low-active method but for each class, and that the entropy of percent activation across classes is below a threshold.

The system and processes shown herein demonstrate a creative decoder within a deep generative framework, which involves direct modulation of the neural activation pattern after sampling from learned latent space. The modulation of the neurons is unsupervised and does not require re-training of the neural network. More specifically, a neural activation patterns in a trained neural network are modified. Through the processes shown and described in FIGS. 1-6, the modulation of the neurons in a deep decoder promotes generation of novel and meaningful artifacts.

Aspects of the functional tools (252)-(256) and their associated functionality may be embodied in a computer system/server in a single location, or in an embodiment, may be configured in a cloud based system sharing computing resources. With references to FIG. 7, a block diagram (700) is provided illustrating an example of a computer system/server (702), hereinafter referred to as a host (702) in communication with a cloud based support system, to implement the processes described above with respect to FIGS. 3-6. Host (702) is operational with numerous other general purpose or special purpose computing system environments or configurations. Examples of well-known computing systems, environments, and/or configurations that may be suitable for use with host (702) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (702) may be described in the general context of computer system-executable instructions, such as program modules, being executed by a computer system. Generally, program modules may include routines, programs, objects, components, logic, data structures, and so on that perform particular tasks or implement particular abstract data types. Host (702) may be practiced in distributed cloud computing environments (710) where tasks are performed by remote processing devices that are linked through a communications network. In a distributed cloud computing environment, program modules may be located in both local and remote computer system storage media including memory storage devices.

Figure 7:
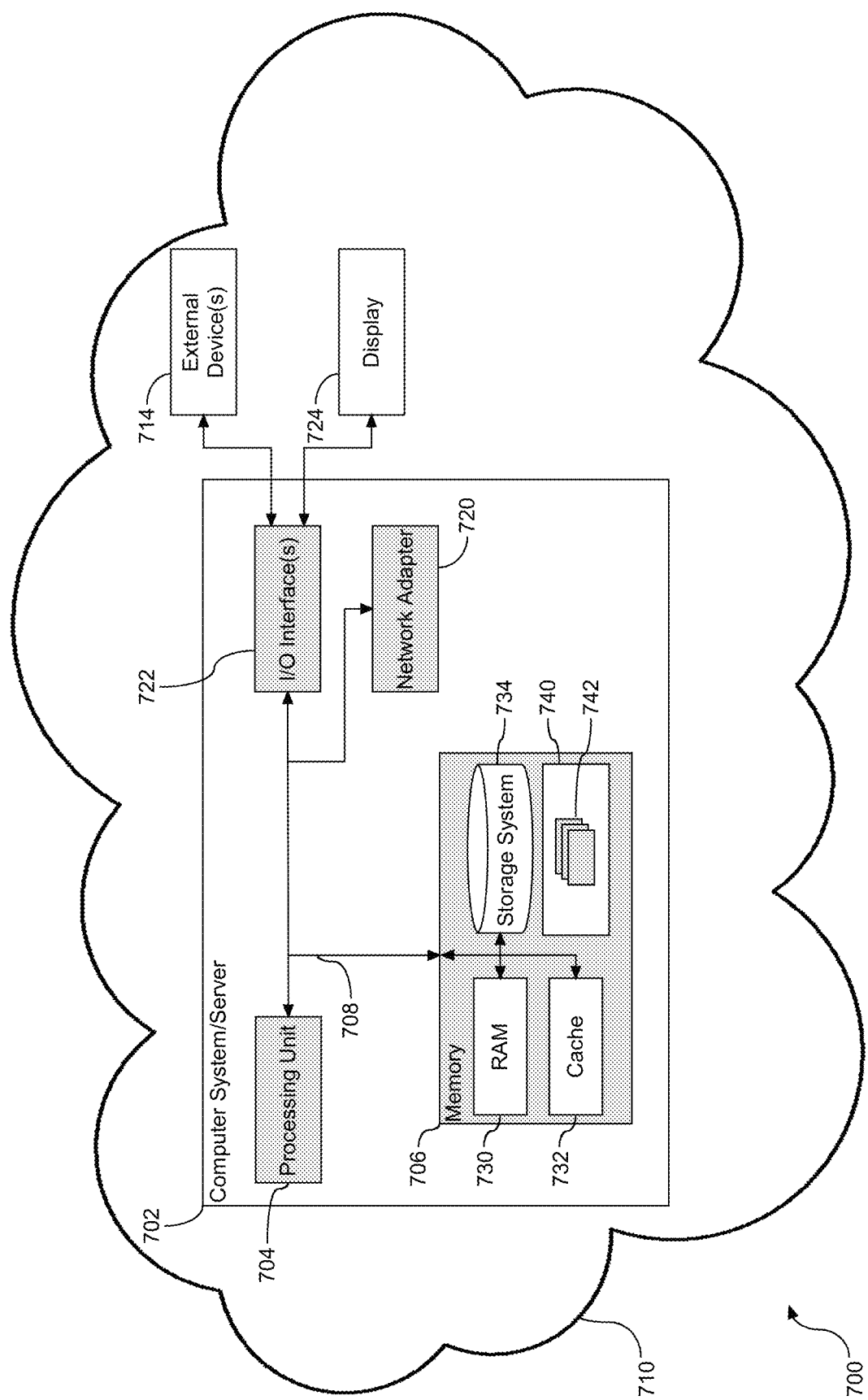
FIG. 7 depicts a block diagram illustrating an example of a computer system/server of a cloud based support system, to implement the system and processes described above with respect to FIGS. 1-6.

As shown in FIG. 7, host (702) is shown in the form of a general-purpose computing device. The components of host (702) may include, but are not limited to, one or more processors or processing units (704), e.g. hardware processors, a system memory (706), and a bus (708) that couples various system components including system memory (706) to processor (704). Bus (708) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (702) typically includes a variety of computer system readable media. Such media may be any available media that is accessible by host (702) and it includes both volatile and non-volatile media, removable and non-removable media.

Memory (706) can include computer system readable media in the form of volatile memory, such as random access memory (RAM) (730) and/or cache memory (732). By way of example only, storage system (734) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (708) by one or more data media interfaces.

Program/utility (740), having a set (at least one) of program modules (742), may be stored in memory (706) by way of example, and not limitation, as well as an operating system, one or more application programs, other program modules, and program data. Each of the operating systems, one or more application programs, other program modules, and program data or some combination thereof, may include an implementation of a networking environment. Program modules (742) generally carry out the functions and/or methodologies of embodiments to dynamically communication evaluation interrogatory identification and processing. For example, the set of program modules (742) may include the tools (152)-(156) as described in FIG. 1

Host (702) may also communicate with one or more external devices (714), such as a keyboard, a pointing device, etc.; a display (724); one or more devices that enable a user to interact with host (702); and/or any devices (e.g., network card, modem, etc.) that enable host (702) to communicate with one or more other computing devices. Such communication can occur via Input/Output (I/O) interface(s) (722). Still yet, host (702) can communicate with one or more networks such as a local area network (LAN), a general wide area network (WAN), and/or a public network (e.g., the Internet) via network adapter (720). As depicted, network adapter (720) communicates with the other components of host (702) via bus (708). In an embodiment, a plurality of nodes of a distributed file system (not shown) is in communication with the host (702) via the I/O interface (722) or via the network adapter (720). It should be understood that although not shown, other hardware and/or software components could be used in conjunction with host (702). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (706), including RAM (730), cache (732), and storage system (734), such as a removable storage drive and a hard disk installed in a hard disk drive.

Computer programs (also called computer control logic) are stored in memory (706). Computer programs may also be received via a communication interface, such as network adapter (720). Such computer programs, when run, enable the computer system to perform the features of the present embodiments as discussed herein. In particular, the computer programs, when run, enable the processing unit (704) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In an embodiment, host (702) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
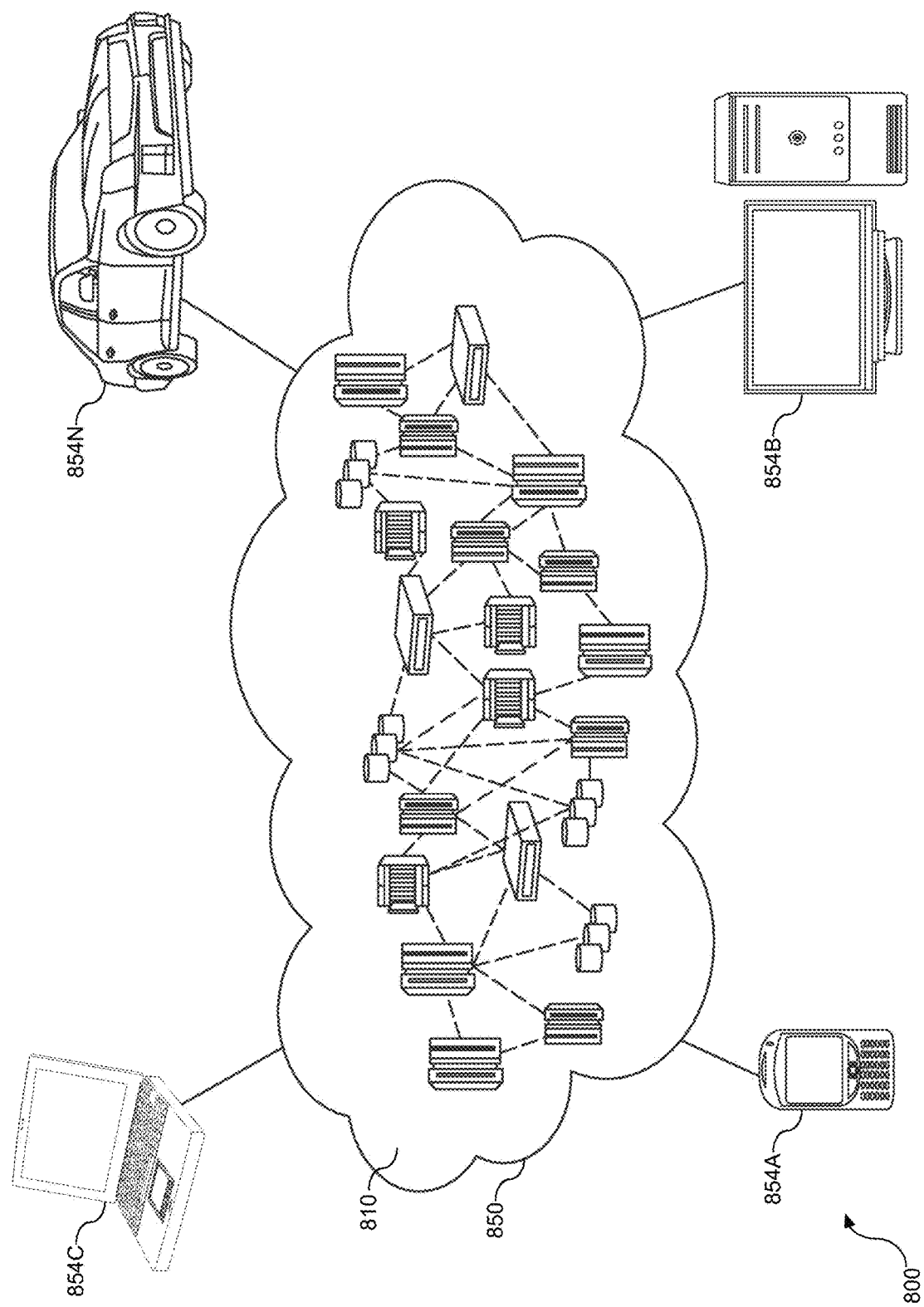
FIG. 8 depicts a block diagram illustrating a cloud computer environment.

Referring now to FIG. 8, an illustrative cloud computing network (800). As shown, cloud computing network (800) includes a cloud computing environment (850) having one or more cloud computing nodes (810) with which local computing devices used by cloud consumers may communicate. Examples of these local computing devices include, but are not limited to, personal digital assistant (PDA) or cellular telephone (854A), desktop computer (854B), laptop computer (854C), and/or automobile computer system (854N). Individual nodes within nodes (810) may further communicate with one another. They may be grouped (not shown) physically or virtually, in one or more networks, such as Private, Community, Public, or Hybrid clouds as described hereinabove, or a combination thereof. This allows cloud computing environment (800) to offer infrastructure, platforms and/or software as services for which a cloud consumer does not need to maintain resources on a local computing device. It is understood that the types of computing devices (854A-N) shown in FIG. 8 are intended to be illustrative only and that the cloud computing environment (850) can communicate with any type of computerized device over any type of network and/or network addressable connection (e.g., using a web browser).

Figure 9:
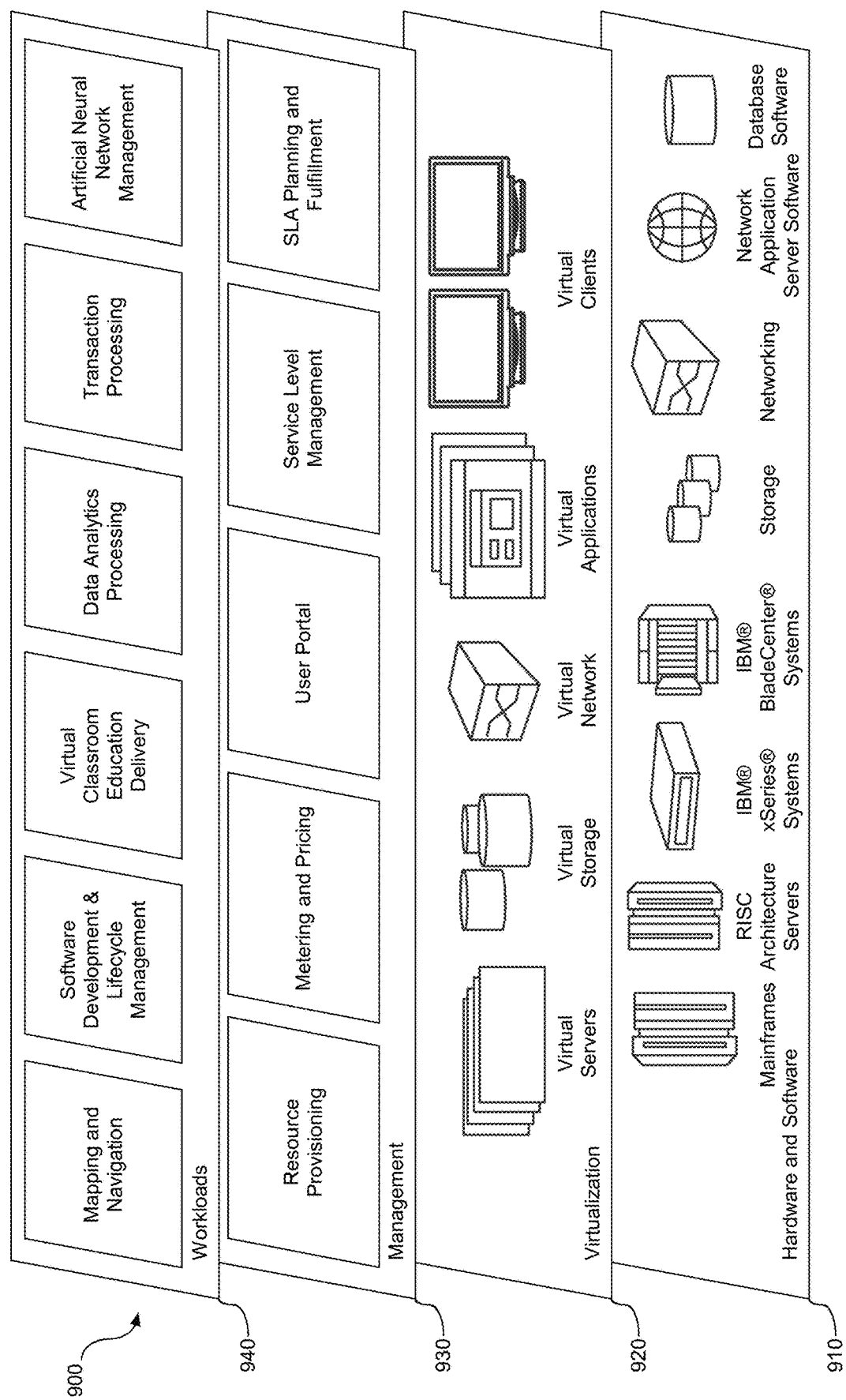
FIG. 9 depicts a block diagram illustrating a set of functional abstraction model layers provided by the cloud computing environment.

Referring now to FIG. 9, a set of functional abstraction layers (900) provided by the cloud computing network of FIG. 8 is shown. It should be understood in advance that the components, layers, and functions shown in FIG. 9 are intended to be illustrative only, and the embodiments are not limited thereto. As depicted, the following layers and corresponding functions are provided: hardware and software layer (910), virtualization layer (920), management layer (930), and workload layer (940).

The hardware and software layer (910) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (920) provides an abstraction layer from which the following examples of virtual entities may be provided: virtual servers; virtual storage; virtual networks, including virtual private networks; virtual applications and operating systems; and virtual clients.

In one example, management layer (930) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (940) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and artificial neural network management.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform, and more specifically to induce creativity in an ANN and generate novel creative data instances via modification to neuron activation patterns of the neural network.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
   a processor operatively coupled to memory;
   an artificial intelligence (AI) platform, in communication with the processor, the AI platform having machine learning (ML) tools to induce creativity in an artificial neural network (ANN) by automatic selection and manipulation of neurons from one or more layers of an operatively coupled decoder, the tools comprising:
      an encoding manager to sample an encoded vector corresponding to an encoded object represented in latent space;
      an evaluation manager to evaluate decoder neurons and a corresponding activation pattern for the encoded object;
      the evaluation manager to select one or more decoder neurons based on the evaluated activation pattern; and
      an activation manager to selectively change an activation setting of the one or more selected decoder neurons; and
   one or more novel data instances automatically generated from an original latent space of the selectively changed decoder neurons.

2. The computer system of claim 1, wherein selectively changing an activation setting of the selected decoder neurons includes deactivating a neuron or activating a neuron, wherein a deactivated a neuron is from an active neuron or an activated neuron, and an activated neuron is selected from a non-active neuron.

3. The computer system of claim 1, wherein evaluating decoder neurons includes capturing concepts encoded in multiple neurons, including:
   the evaluation manager to randomly select an inactive neuron from a group of inactive neurons that is least correlated with an activated group of neurons;
   the evaluation manager to select one or more additional neurons that are correlated with the randomly selected inactive neuron; and
   wherein the activation manager to selectively change an activation setting of the selected decoder neurons includes activating all of the selected one or more additional neurons.

4. The computer system of claim 1, wherein evaluating decoder neurons includes capturing concepts encoded in clusters of neurons, including:
   the evaluation manger to identify cluster membership;
   the evaluation manager to randomly select one or more clusters with a lowest percent activation for a given instance and decoder layer; and
   the activation manager to randomly activate one or more neurons in the randomly selected one or more clusters.

5. The computer system of claim 1, wherein evaluating decoder neurons includes capturing concepts encoded in clusters of neurons, including:
   the evaluation manager to select one or more neurons from de-activated neurons that have a low percent activations across generated objects of an object type from the network; and
   the activation manager to activate the selected one or more low percent activation neurons and one or more neurons strongly correlated with the activated one or more low percent activation neurons.

6. The computer system of claim 1, wherein evaluating decoder neurons includes capturing concepts encoded in clusters of neurons, including:
   the evaluation manager to select one or more neurons from de-activated neurons that have a low percent activation for each of a set of generated objects for each category of conditional input to the network; and
   the activation manager to activate the selected one or more neurons designated as low percentage activation neurons and one or more neurons strongly correlated with the activated one or more low percentage activation neurons.

7. The computer system of claim 1, further comprising evaluating creativity reflected in the one or more generated data instances, including characterizing distances between a first encoded object representation and a second modified object representation induced by the ANN.

8. A computer program product to induce creativity in an artificial neural network (ANN), the ANN network having an encoder and an operatively coupled decoder, by automatically selecting and manipulating neurons from one or more layers of the encoder, the computer program product comprising a computer readable storage medium having program code embodied therewith, the program code executable by a processor to:
   sample an encoded vector for an encoded image;
   evaluate decoder neurons and a corresponding activation pattern for the encoded image;
   select decoder neurons based on the evaluated activation pattern;
   selectively change an activation setting of the selected decoder neurons; and
   one or more novel data instances automatically generated from an original latent space of the selectively changed decoder neurons.

9. The computer program product of claim 8, wherein selectively changing an activation setting of the selected decoder neurons includes deactivating an activate neuron and activating a non-active neuron.

10. The computer program product of claim 8, wherein evaluating decoder neurons includes capturing concepts encoded in multiple neurons, including the program code to:
    randomly select an inactivate neuron from a group of inactivate neurons that is least correlated with an activated group of neurons; and
    select additional neurons that are correlated with the randomly selected inactivate neuron; and
    wherein selectively changing an activation setting of the selected decoder neurons includes activating all of the selected additional neurons.

11. The computer program product of claim 8, wherein evaluating decoder neurons includes capturing concepts encoded in clusters of neurons, including the program code to:
    identify cluster membership;
    randomly select one or more clusters with a lowest percent activation for a given instance and decoder layer; and
    randomly activate neurons in the randomly selected one or more clusters.

12. The computer program product of claim 8, wherein evaluating decoder neurons includes capturing concepts encoded in clusters of neurons, including the program code to:
    select one or more neurons from de-activated neurons that have a low percent activations across generated objects of an object type from the network; and
    activate the selected one or more low percent activation neurons and one or more neurons strongly correlated with the activated one or more low percent activation neurons.

13. The computer program product of claim 8, further comprising wherein evaluating decoder neurons includes capturing concepts encoded in clusters of neurons, including the program code to:
    select one or more neurons from de-activated neurons that have a low percent activation for each of a set of generated objects for each category of conditional input to the network; and
    activate the selected one or more neuron designated as low percent activation neurons and one or more neurons strongly correlated with the activated one or more low percent activation neuron.

14. The computer program product of claim 8, further comprising evaluating creativity reflected in the one or more generated data instances, including characterizing distances induced by the ANN.

15. A method comprising:
    inducing creativity in an artificial neural network (ANN), the ANN network having an encoder and an operatively coupled decoder, by automatically selecting and manipulating neurons from one or more layers of the encoder, including:
    sampling an encoded vector for an encoded image;
    evaluating decoder neurons and a corresponding activation pattern for the encoded image;
    selecting decoder neurons based on the evaluated activation pattern; and
    selectively changing an activation setting of the selected decoder neurons; and
    one or more novel data instances automatically generated from an original latent space of the selectively changed decoder neurons.

16. The method of claim 15, wherein selectively changing an activation setting of the selected decoder neurons includes deactivating an activate neuron and activating a non-active neuron.

17. The method of claim 15, wherein evaluating decoder neurons includes capturing concepts encoded in multiple neurons, including:
    randomly selecting an inactivate neuron from a group of inactivate neurons that is least correlated with an activated group of neurons; and
    selecting additional neurons that are correlated with the randomly selected inactivate neuron; and
    wherein selectively changing an activation setting of the selected decoder neurons includes activating all of the selected additional neurons.

18. The method of claim 15, wherein evaluating decoder neurons includes capturing concepts encoded in clusters of neurons, including:
    identifying cluster membership;
    randomly selecting one or more clusters with a lowest percent activation for a given instance and decoder layer; and
    randomly activating neurons in the randomly selected one or more clusters.

19. The method of claim 15, wherein evaluating decoder neurons includes capturing concepts encoded in clusters of neurons, including:
    selecting a neuron from de-activated neurons that have a low percent activations across generated objects of an object type from the network; and
    activating one or more selected low percent activation neurons and one or more neurons strongly correlated with the activated one or more low percent activation neurons.

20. The method of claim 15, further comprising wherein evaluating decoder neurons includes capturing concepts encoded in clusters of neurons, including:

selecting a neuron from de-activated neurons that have a lowest percent activations for each of a set of generated objects for each category of conditional input to the network; and activating the selected neuron designated as low percent activation neurons and one or more neurons strongly correlated with the activated low percent activation neuron.

* * * * *